(No Model.)
R. L. COLBY.
THRASHING MACHINE.
No. 433,764. Patented Aug. 5, 1890.
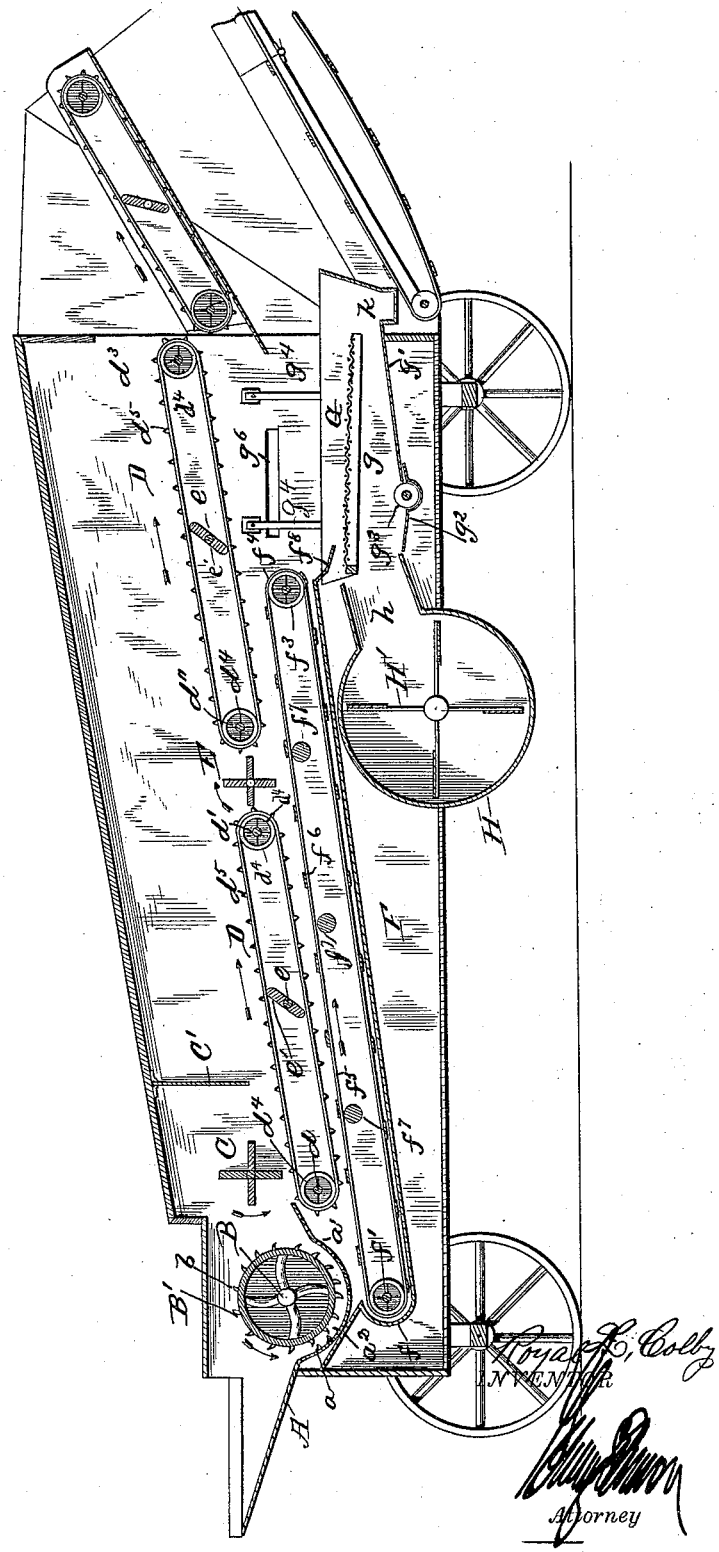
WITNESSES

UNITED STATES PATENT OFFICE.

ROYAL L. COLBY, OF ALEXANDRIA, MINNESOTA.

THRASHING-MACHINE.

SPECIFICATION forming part of Letters Patent No. 433,764, dated August 5, 1890.

Application filed October 7, 1884. Renewed January 16, 1890. Serial No. 337,039. (No model.)

*To all whom it may concern:*

Be it known that I, ROYAL L. COLBY, a citizen of the United States of America, residing at Alexandria, in the county of Douglas and State of Minnesota, have invented certain new and useful Improvements in Thrashing-Machines; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

My invention relates to thrashing-machines; and it consists in the particular construction and combination, hereinafter described and claimed.

In the accompanying drawing a thrashing-machine embodying my improvement is illustrated by a vertical longitudinal section.

The frame or casing of the thrashing-machine may be constructed and arranged in any preferred manner and mounted upon carrying-wheels. At the front of the casing is arranged an inclined feed-table A, which extends into the forward part of the machine and is depressed to form a concave $a$, and then extended and perforated to present a grating $a'$. The forward part of the concave is provided with a series of vertical spurs or teeth $a^2$. A shaft B is journaled in bearings secured to the sides of the casing at the forward part, and has mounted thereon a thrashing-cylinder B', arranged concentrically with relation to the concave $a$, and provided peripherally with a number of spurs or teeth $b$, which alternate with and, as the cylinder B' is rotated, move in close proximity to the teeth $a^2$ of the concave. The shaft B is at one end extended outside the casing, and provided with a gear-wheel or pulley through which power can be applied to run the cylinder. A beater C and hinged dust-guard C' may be arranged in rear of the thrashing-cylinder, if desired.

Four shafts $d\ d'\ d''\ d^3$ are arranged in an inclined plane in line with each other, each of said shafts being mounted in suitable bearings secured to the sides of the casing, and two (or more) of them having projecting ends to receive band-pulleys for receiving and transmitting the requisite driving-power. The shaft $d$ is located below and slightly rearward of the edge of the inclined grating $a'$, and the shafts $d'\ d''$ are arranged parallel with each other and a short distance apart, as illustrated. Each shaft $d\ d'$ carries at each end a pulley $d^4$, and these pulleys are belted together by endless webs D, carrying a series of transverse bars or cleats $d^5$. The shafts $d''$ and $d^3$ are also provided with pulleys $d^4$, belts D, and cleats $d^5$, thus constituting two complete endless straw-carriers separated from each other at about the center of the machine by a slight intervening space, within which a beater E may be arranged, if desired.

An agitator $e'$ is arranged between the upper and lower laps of the respective carriers, and serves by its rotation to vibrate the carriers and shake the grain free from the straw.

F represents a floor, which is arranged at an incline, as shown, the lower forward end being bent to form a half-circular recess $f$, and thence extended upward and forward beneath the concave $a$ and secured to the front wall of the casing. The rear end of this floor F extends beneath the lower forward end of the second straw-carrier, as shown.

Shafts $f'\ f^3$, carrying pulleys $f^4$, are journaled, respectively, above the floor F near its ends, the pulleys on the forward shaft $f'$ being partly encircled by the semicircular recess $f$ of the floor, and upon these pulleys $f^4$ is mounted an endless belt $f^5$, provided at intervals with transverse strips or cleats $f^6$. The upper lap of this carrier is supported in a plane with the periphery of the pulleys $f^4$ by rollers $f^7$, while the cleats $f^6$ upon the lower lap travel in close proximity with the floor F. The curved portion or recess $f$ of the floor is concentric with and partly overlaps the lower end of the grain-carrier apron $f^5$, the distance between the floor and apron being just sufficient for the passage of the cleats $f^6$, so that any grain escaping past the belt will fall upon the floor F and be swept by the cleats into the recess $f$, and so upward onto the upper lap of the carrier-apron $f^5$. Grain falling from the concave $a$ or grating $a'$ will be received directly upon the apron $f^5$, or be deflected thereon from the incline which extends forward from the recess $f$ of the floor F, or be lodged upon said floor and carried around to the top of the apron by the cleats $f^6$, as described.

The rear end of the floor F projects slightly beyond the shaft $f^3$, and is bent downward to form an inclined chute $f^8$, which delivers grain to a shaking shoe or screen G of any usual or preferred construction—as, for instance, that shown in the drawing.

In operation, material fed onto the table A is delivered between the thrashing-cylinder and concave, and from thence to the straw-carriers, which are, of course, so constructed as to permit the separated grain to fall freely through to the grain-carrier and shaking shoe beneath.

Having thus described my invention, what I claim, and desire to secure by Letters Patent, is—

In a thrashing-machine, the combination of the cylinder, the perforated concave having a grated extension, the straw-carriers, the endless grain-carrier, pulleys on which said carriers are supported, and the floor arranged beneath the grain-carrier and shaped at its forward end to partly encircle and overhang the forward pulley of the grain-carrier and extend thence upwardly beneath the concave to the front of the casing, substantially as described.

In testimony whereof I affix my signature in presence of two witnesses.

ROYAL L. COLBY.

Witnesses:
GEORGE C. SIMS,
MAHLON B. LATHROP.